United States Patent
Sangameshwara et al.

(10) Patent No.: US 12,101,364 B2
(45) Date of Patent: Sep. 24, 2024

(54) METHODS AND SYSTEMS TO SHARE FUNCTIONAL ALIAS IN MISSION CRITICAL VIDEO

(71) Applicant: Samsung Electronics Co., Ltd., Suwon-si (KR)

(72) Inventors: Vijay Sangameshwara, Bangalore (IN); Kiran Gurudev Kapale, Bangalore (IN); Siva Prasad Gundur, Bangalore (IN); Sreekanth Vadakkepurakkal Chandran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 17/682,630

(22) Filed: Feb. 28, 2022

(65) Prior Publication Data

US 2022/0224740 A1   Jul. 14, 2022

Related U.S. Application Data

(63) Continuation of application No. PCT/KR2021/010832, filed on Aug. 13, 2021.

(30) Foreign Application Priority Data

Aug. 13, 2020 (IN) .............................. 202041034772
Jul. 12, 2021 (IN) ............................. 2020 41034772

(51) Int. Cl.
*H04L 65/60*   (2022.01)
*H04L 65/1069*   (2022.01)
(Continued)

(52) U.S. Cl.
CPC .......... *H04L 65/60* (2013.01); *H04L 65/1069* (2013.01); *H04L 65/1104* (2022.05); *H04L 65/403* (2013.01)

(58) Field of Classification Search
CPC . H04L 65/60; H04L 65/1069; H04L 65/1104; H04L 65/403; H04N 7/147
See application file for complete search history.

(56) References Cited

U.S. PATENT DOCUMENTS

| 8,411,129 B2 * | 4/2013 | Satterlee ................ H04N 7/152 |
| | | 348/14.09 |
| 9,325,753 B2 | 4/2016 | Walters et al. |

(Continued)

FOREIGN PATENT DOCUMENTS

| CN | 107465546 A | 12/2017 |
| WO | 2018/062940 A1 | 4/2018 |
| WO | 2020/083322 A1 | 4/2020 |

OTHER PUBLICATIONS

3GPP TS 24.581 V15.5.0, 3rd Generation Partnership Project; Technical Specification Group Core Network and Terminals; Mission Critical Video (MCVideo) media plane control; Protocol specification (Release 15), Jun. 2020.

(Continued)

*Primary Examiner* — Kristie D Shingles
(74) *Attorney, Agent, or Firm* — Jefferson IP Law, LLP

(57) ABSTRACT

A method for managing a Mission Critical Video (MCVideo) group call is provided. The method includes transmitting by at least one sender user equipment (UE) in the MCVideo group call, a MCVideo message to an MCVideo Server, receiving, by at least one receiver UE in the MCVideo group call, the MCVideo message from the MCVideo server, wherein at least one of a plurality of functional alias identification (ID) is encoded and included in the MCVideo message, and decoding, by the at least one receiver UE in the MCVideo group call, the at least one of the plurality of functional alias ID from the MCVideo message.

10 Claims, 8 Drawing Sheets

(51) Int. Cl.
    *H04L 65/1104*     (2022.01)
    *H04L 65/403*     (2022.01)

(56) References Cited

U.S. PATENT DOCUMENTS

| | | | |
|---|---|---|---|
| 11,186,274 B2 * | 11/2021 | Atarius | G01S 17/04 |
| 11,337,039 B2 * | 5/2022 | Paterour | H04W 4/08 |
| 2011/0154446 A1 | 6/2011 | Drozt et al. | |
| 2013/0176383 A1 * | 7/2013 | Satterlee | H04L 12/1822 |
| | | | 348/14.09 |
| 2019/0098692 A1 * | 3/2019 | Atarius | H04L 65/1069 |
| 2019/0241179 A1 * | 8/2019 | Atarius | G01S 17/10 |
| 2020/0084827 A1 * | 3/2020 | Atarius | H04N 7/147 |
| 2020/0120454 A1 | 4/2020 | Gundur et al. | |
| 2020/0153838 A1 * | 5/2020 | Ge | H04L 61/30 |
| 2020/0396266 A1 * | 12/2020 | Goel | H04L 67/306 |
| 2021/0243593 A1 | 8/2021 | Ge et al. | |

OTHER PUBLICATIONS

3GPP TS 24.281 V17.0.0, 3rd Generation Partnership Project; Technical Specification Group Core Network and Terminals; Mission Critical Video (MCVideo) signalling control; Protocol specification (Release 17), Sep. 24, 2020.

Indian Examination Report dated Jun. 13, 2022, issued in Indian Application No. 202041034772.

Extended European Search Report dated May 12, 2023, issued in European Application No. 21856296.5.

* cited by examiner

METHODS AND SYSTEMS TO SHARE FUNCTIONAL ALIAS IN MISSION CRITICAL VIDEO

CROSS-REFERENCE TO RELATED APPLICATION(S)

This application is a continuation application, claiming priority under § 365(c), of an International application No. PCT/KR2021/010832, filed on Aug. 13, 2021, which is based on and claims the benefit of an Indian Provisional patent application number 202041034772, filed on Aug. 13, 2020, in the Indian Intellectual Property Office, and of an Indian Complete patent application number 202041034772, filed on Jul. 12, 2021, in the Indian Intellectual Property Office, the disclosure of each of which is incorporated by reference herein in its entirety.

BACKGROUND

1. Field

The disclosure relates to methods and systems for Mission Critical Video (MCVideo) communication service. More particularly, the disclosure relates to methods and systems to share Functional Alias in Mission Critical Video Service.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Currently, the MCVideo service is used vastly in public safety services. A number of First Responders receive media content in the form of audio, video on the user equipment (UE) and the first responders act according to the received media content. The media content may indicate an emergency situation such as an accident, fire hazard, or the like.

The above information is presented as background information only to assist with an understanding of the disclosure. No determination has been made, and no assertion is made, as to whether any of the above might be applicable as prior art with regard to the disclosure.

SUMMARY

Since multiple MCVideo users from different locations are able to connect together, therefore, it becomes important to recognise the role of the users being connected together. In the existing $3^{rd}$ generation partnership project (3GPP) MCVideo service, the user is not able to share his/her preferred role (termed as Functional Alias):

1. Either while starting or joining a group call or
2. Either while "Requesting for Transmission" or "Request for Reception" in MCVideo Group Call.

Thus, as may be seen, there exists a need to overcome at least one of the aforementioned problems to enable usage of Functional Alias assigned to users participating in MCVideo Group Call.

Aspects of the disclosure are to address at least the above-mentioned problems and/or disadvantages and to provide at least the advantages described below. Accordingly, an aspect of the disclosure is to provide a method for managing a Mission Critical Video (MCVideo) group call.

Additional aspects will be set forth in part in the description which follows and, in part, will be apparent from the description, or may be learned by practice of the presented embodiments.

In accordance with an aspect of the disclosure, a method for enabling usage of a plurality of functional alias identification (ID) in a Mission Critical Video (MCVideo) group call is provided. The method includes transmitting, by at least one sender user equipment (UE) in the MCVideo group call, a MCVideo message to an MCVideo Server, wherein at least one of the plurality of functional alias ID is encoded and included in the MCVideo message during the transmitting, receiving, by at least one receiver UE in the MCVideo group call, the MCVideo message of the at least one sender UE from the MCVideo server, and decoding, by the at least one receiver UE in the MCVideo group call, the at least one of the plurality of functional alias ID from the MCVideo message.

In accordance with another aspect of the disclosure, a system for enabling usage of a plurality of functional alias ID in a Mission Critical Video (MCVideo) group call is provided. The system is configured to transmit, by at least one sender user equipment (UE) in the MCVideo group call, a MCVideo message to an MCVideo Server, wherein at least one of the plurality of functional alias ID is encoded and included in the MCVideo message during the transmit, receive, by at least one receiver UE in the MCVideo group call, the MCVideo message of the at least one sender UE from the MCVideo server, and The system is configured to decode, by the at least one receiver UE in the MCVideo group call, the at least one of the plurality of functional alias ID from the MCVideo message.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
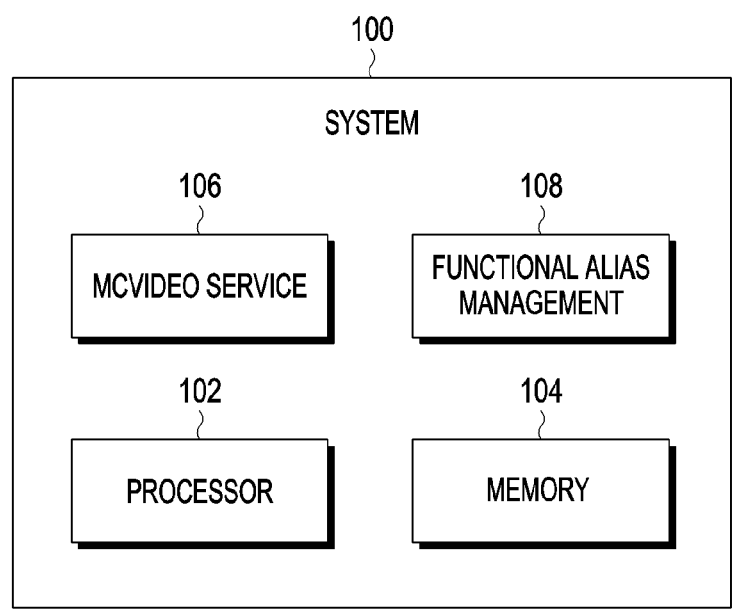
FIG. 1 illustrates a system for sharing functional alias in MCVideo group call, according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this disclosure belongs. The system, methods, and examples provided herein are illustrative only and not intended to be limiting.

The disclosure provides methods and systems that enables users to share their preferred Functional Alias while starting or joining a MCVideo group call and while requesting for transmission or reception. In the disclosure, the Functional Alias is proposed as an "XML element" as part of the MCVideo extensible markup language (XML) identified by "application/vnd.3gpp.mcvideo-info+xml" content type carried in session initial protocol (SIP) Messages and "Functional Alias ID field" as part of Transmission Request message, Media Transmission Notification (MTN) message, Receive Media request and Media Reception Notification (MRN) messages. In the disclosure, the user may be able to choose the suitable role or designation before joining the MCVideo Group call and the suitable role or designation is visible to the other users in the call. In other words, the functional alias indicates the role or designation of a user connected in a MCVideo environment/service.

In the disclosure, the term "user" may interchangeably be referred to as "participant" In addition, the term "functional alias" may interchangeably be referred to as "role or designation"

FIG. 1 illustrates a system for sharing functional alias in MCVideo group call, according to an embodiment of the disclosure.

Referring to FIG. 1, the system 100 of the disclosure may include, but is not limited to, a processor 102, memory 104, MCVideo Service unit 106 and Functional Alias Management unit 108.

The processor 102 may be a single processing unit or a number of units, all of which could include multiple computing units. The processor 102 may be implemented as one or more microprocessors, microcomputers, microcontrollers, digital signal processors, central processing units, state machines, logic circuitries, and/or any devices that manipulate signals based on operational instructions. Among other capabilities, the processor 102 is configured to fetch and execute computer-readable instructions and data stored in the memory 104.

The memory 104 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The MCVideo Service 106 provides the MCVideo group and private call services features. In an embodiment, for a MCVideo Group call provided by MCVideo Service 106, a host or an organization may define roles or designations of the participants joining the call. Therefore, the participants may choose a particular role or designation before joining the call. The chosen role or designation is visible to all the participants in addition to the name of the participant, in the call.

The Functional Alias Management unit 108 provides management of multiple aliases and also Activation and De-activation of aliases. In an embodiment, an organisation or a group or a company may pre-define the function alias managed by Functional Alias Management unit 108 in the system applicable for the participants for a MCVideo Group call. Therefore, for such MCVideo Group call, the participants may choose one of the pre-defined role or designation before joining the call.

The disclosure includes a system 100 for enabling usage of a plurality of functional alias ID in a Mission Critical Video (MCVideo) group call. The system 100 is configured to transmit, by at least one sender user equipment (UE) in the MCVideo group call, an MCVideo message to an MCVideo Server. The system 100 is configured to receive, by at least one receiver UE in the MCVideo group call, the MCVideo message from the MC video server, wherein at least one of a plurality of functional alias ID is encoded and included in the MCVideo message. The system 100 is configured to decode, by the at least one receiver UE in the MCVideo group call, the at least one of the plurality of functional alias ID from the MCVideo message.

The system 100 may be configured to send the encoded at least one of the plurality of functional alias ID from the MCVideo message to participants of the MCVideo group call in group call request.

In an embodiment, the at least one sender UE may be the initiator of the MCVideo group call. According to another embodiment, the at least one sender UE may not be the initiator of the MCVideo group call.

The functional alias ID may include incorporating a functional-alias-URI based element to MCVideo Info XML schema to enable sharing of the plurality of functional alias ID.

For transmitting the MCVideo message, the system may be configured to check if status of the at least one of the plurality of functional alias ID is activated and add the at least one of the plurality of functional alias ID to the MCVideo message.

Further, the system is configured to check if status of the at least one of the plurality of functional alias ID is one of not-activated or deactivated and add user ID to the MCVideo message.

The status of the at least one of the plurality of functional alias ID may include:
1) the not-activated state wherein the at least one of the plurality of functional alias ID is not activated by the user;
2) an activating state wherein the at least one of the plurality of functional alias ID is not yet activated for the user;
3) the activated state wherein the at least one of the plurality of functional alias ID is activated for the user; and
4) the deactivated state wherein the at least one of the plurality of functional alias ID is activated but not used by the user.

The disclosure includes a system 100 for sharing of a plurality of functional alias ID of MCVideo transmission participant in a Transmission Request message. The system 100 is configured to transmit, by at least one Transmission participant sender user equipment (UE), a Transmission Request message to a Transmission Control Server, wherein at least one of the plurality of functional alias ID is encoded and included in the Transmission Request message.

The disclosure includes a system 100 for obtaining of a plurality of functional alias ID at MCVideo Transmission participant receivers in Media Transmission Notification (MTN) message. The system 100 is configured to transmit, by at least one sender user equipment (UE), a transmission request message to a Transmission Control Server. The system 100 is configured to receive, by at least one Transmission participant receiver UE, the Media Transmission Notification (MTN) message from the Transmission Control Server, wherein at least one of plurality of functional alias ID is encoded and included in the Media Transmission Notification (MTN) message. The system 100 is configured to decode, by the at least one Transmission participant receiver UE, the at least one of the plurality of functional alias ID from the Media Transmission Notification (MTN) message.

Transmitting the transmission request message may comprise including the functional Alias ID to MCVideo Transmission Control Messages as an information element identifier (IEI) Functional Alias field.

The IEI Functional Alias field is incorporated in at least one of:
a) MCVideo Transmission Request Messages;
b) MCVideo Media Transmission Notification Messages;
c) MCVideo Receive Media Request Messages; and
d) MCVideo Media Reception Notification Messages.

The disclosure includes a system 100 for sharing of a plurality of functional alias ID of MCVideo participant in a Receive Media Request message. The system 100 is configured to transmit, by at least one Transmission participant receiver user equipment (UE), a Receive Media Request Message to a Transmission Control Server, wherein at least one of the plurality of functional alias ID is encoded and included in the Receive Media Request Message.

The disclosure includes a system 100 for obtaining of a plurality of functional alias ID at MCVideo Transmission participant sender in Media Reception Notification (MRN) message. The system 100 is configured to transmit, by at least one sender user equipment (UE), a receive media request message to a Transmission Control Server. The system 100 is configured to. receive, by Transmission participant sender UE, the Media Reception Notification (MRN) message from the Transmission Control Server, wherein at least one of plurality of functional alias ID is encoded and included in the Media Reception Notification (MRN) message. The system 100 is configured to decode, by the Transmission participant sender UE, the at least one of the plurality of functional alias ID from the Media Reception Notification (MRN) message.

The MCVideo server may be the same as or different from the Transmission Control Server.

Figure 2:
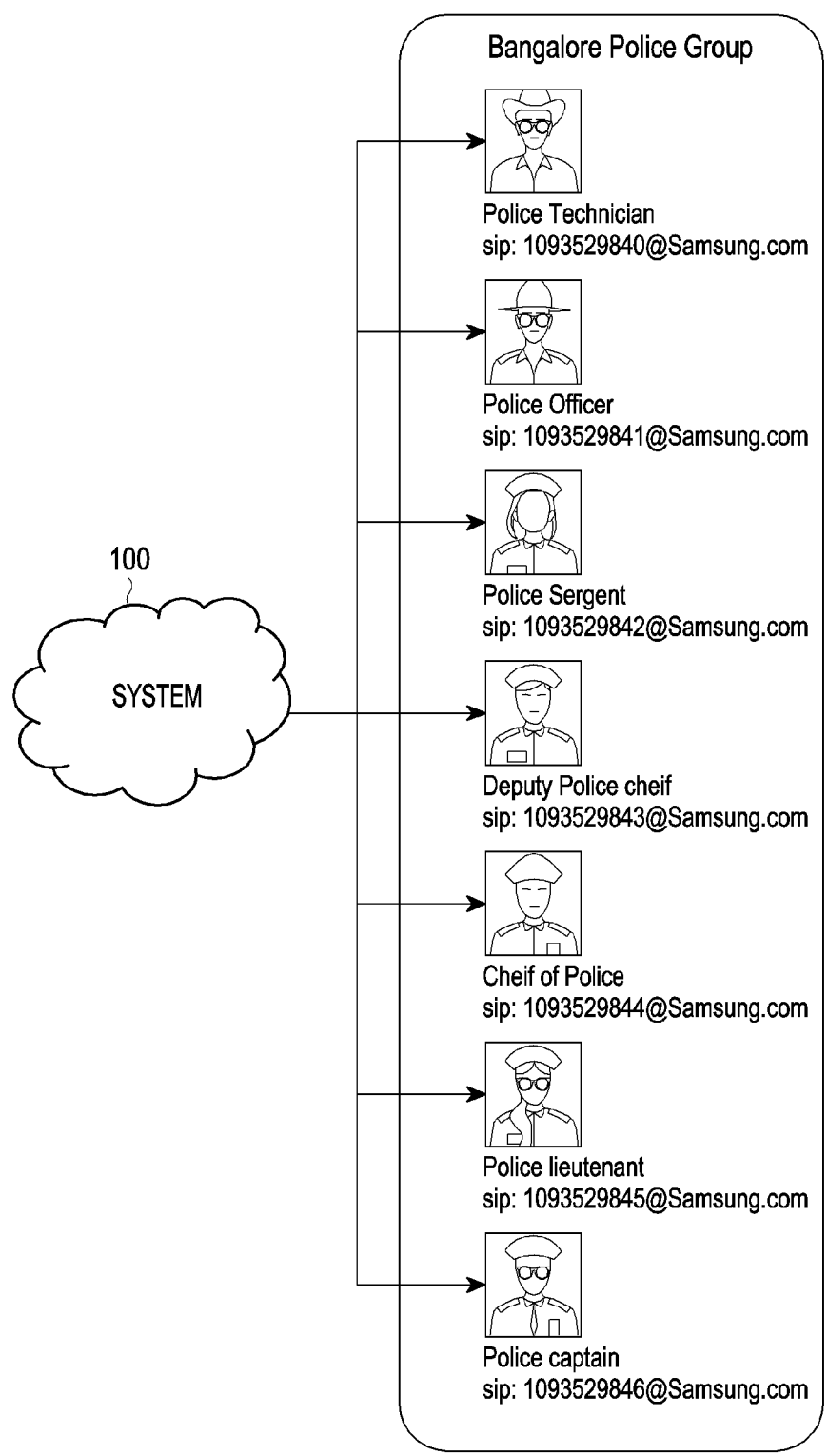
FIGS. 2 and 3 illustrate sharing a functional alias in MCVideo group call, according to various embodiments of the disclosure.
Figure 3:
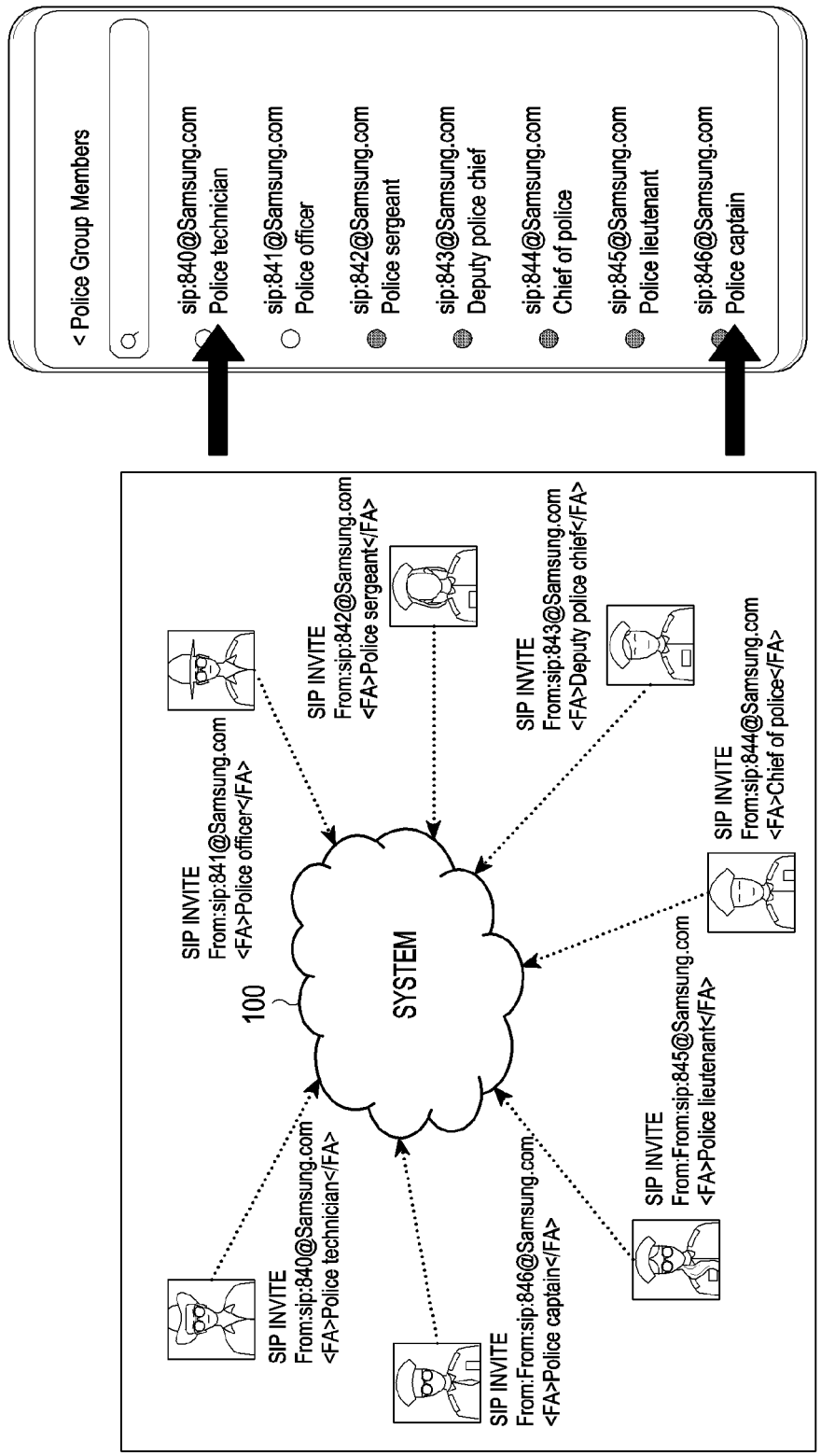

FIGS. 2 and 3 illustrate example embodiment for sharing functional alias in MCVideo group call, according to various embodiments of the disclosure.

FIG. 2 illustrates an overview of Group Members who have joined group call with their assigned functional alias. FIG. 3 illustrates the functional alias chosen by participants while joining the MCVideo Group call and UX detailing the Group members participating in Group Call with their assigned function alias. For example: police technician, police officer, police sergeant, deputy police chief, chief of police, police lieutenant and police captain.

Figure 4:
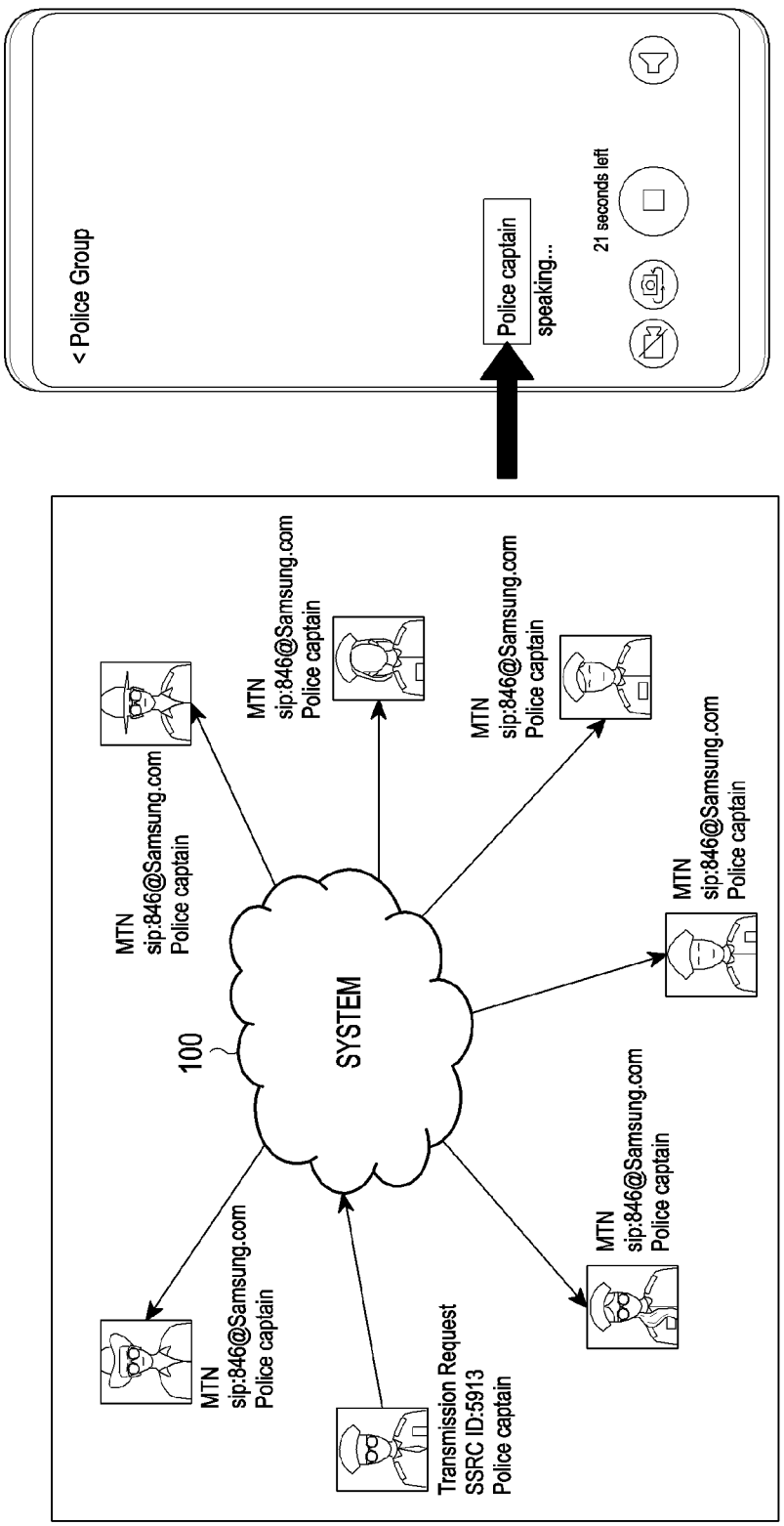
FIGS. 4 and 5 illustrate displaying a functional alias of each user during interaction inside a MCVideo group call allowing participants to identify the role of the interacting participant(s), according to various embodiments of the disclosure.

FIG. 4 illustrates display of functional alias of each user during interaction inside a MCVideo group call allowing participants to identify the role of the interacting participant(s) according to an embodiment of the disclosure.

Referring to FIG. 4, in an example, a Police Captain sends a Transmission Request to the MCVideo Transmission Control Server to share live video streaming. Thereafter, the MCVideo Transmission Control Server then triggers a Media Transmission Notification (MTN) message to all other group members about the Police Captain sharing live video streaming.

Figure 5:
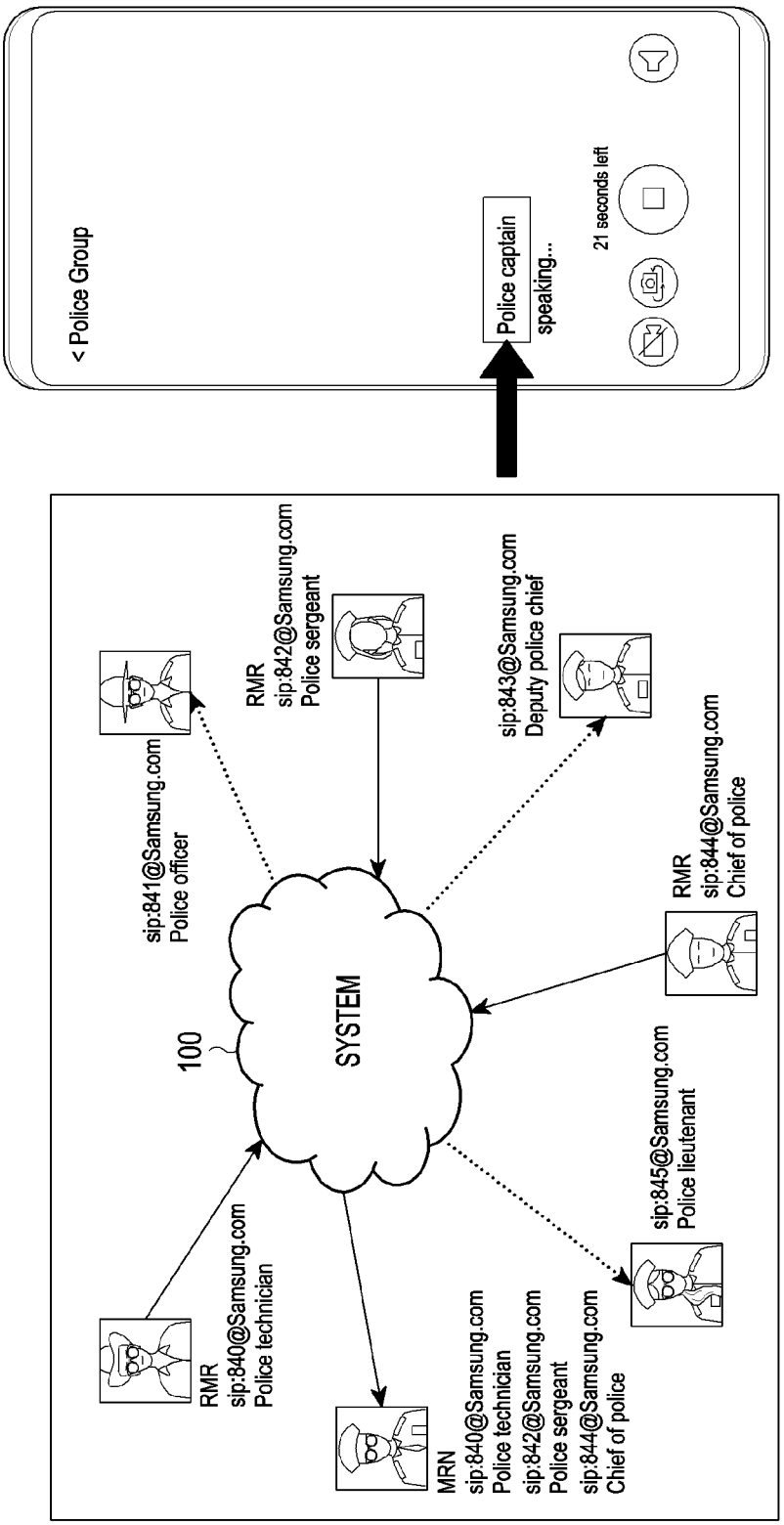

FIG. 5 illustrates display of functional alias of each user during interaction inside a MCVideo group call allowing participants to identify the role of the interacting participant(s) according to an embodiment of the disclosure.

Referring to FIG. 5, in an example, Police members (e.g., a Police technician, a Police Sergeant, the Chief of Police) send a Receive Media Request to the MCVideo Transmission Control Server to get live video streaming from "Police Captain". Thereafter, MCVideo Transmission Control Server then triggers Media Reception Notification (MRN) message to the Police Captain with the list of police members receiving live video streaming.

In an embodiment, the system may provide a user with multiple functional aliases received through MCVideo Service Configuration document and the user may activate or de-activate suitable functional aliases using SIP PUBLISH and Presence Information Data Format. Therefore, the user may choose one of the functional aliases before joining a MCVideo Group call. For another MCVideo Group call, the user may choose a different Functional Alias before joining the call. For example, in one MCVideo Group call in Future Railway Mobile Communication System (FRMCS), the user chooses "Railway.Driver11@bangaloremetro.com" as a Functional Alias and for another MCVideo Group call, the user may choose to be a "Railway.Clerk12@bangaloremetro.com" as a Functional Alias based on his role defined for that journey.

In an embodiment, the user may switch the functional alias based on the activated suitable functional aliases during the MCVideo Group call. For example, one user with Functional Alias as "Railway.Clerk12@bangaloremetro.com" left the call and subsequently, another user in the call may change the Functional Alias as a "Railway.Clerk12@bangaloremetro.com" to continue the call (i.e., role switch is possible).

Figure 6:
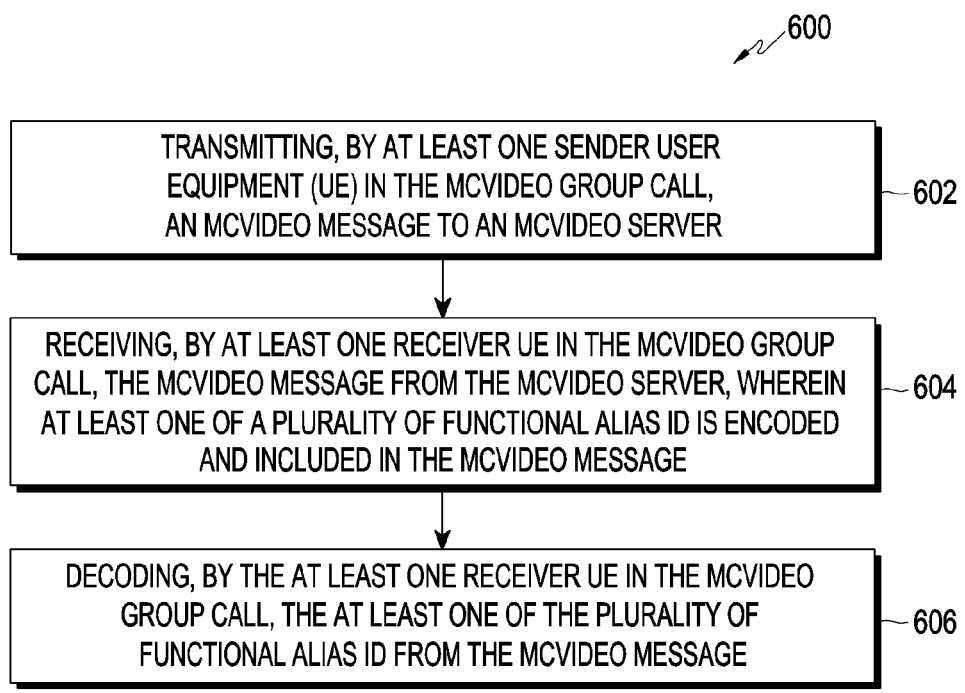
FIG. 6 illustrates a method for sharing functional alias in MCVideo group call, according to an embodiment of the disclosure.

FIG. 6 illustrates a method 600 for sharing functional alias in MCVideo group call, according to an embodiment of the disclosure.

Referring to FIG. 6, at operation 602, by at least one sender user equipment (UE) in the MCVideo group call transmits an MCVideo message to an MCVideo Server. At operation 604, at least one receiver UE in an MCVideo group call receives the MCVideo message from the MC video server, wherein at least one of a plurality of functional alias ID is encoded and included in the MCVideo message. At operation 606, the at least one receiver UE in the MCVideo group call decodes the at least one of the plurality of functional alias ID from the MCVideo message.

The method may include sending the encoded at least one of the plurality of functional alias ID from the MCVideo message to participants of the MCVideo group call in group call request.

In an embodiment, at least one sender UE may be the initiator of the MCVideo group call. According to another embodiment, the at least one sender UE may not be the initiator of the MCVideo group call.

The functional alias ID may include incorporating a functional-alias-URI based element to MCVideo Info XML schema to enable sharing of the plurality of functional alias ID.

Transmitting the MCVideo message may include checking if status of the at least one of the plurality of functional alias ID is activated and adding the at least one of the plurality of functional alias ID to the MCVideo message. The transmitting of the MCVideo message may also include checking if status of the at least one of the plurality of functional alias ID is not-activated or deactivating and adding user ID to the MCVideo message.

The status of the at least one of the plurality of functional alias ID may include:

1) the not-activated state wherein the at least one of the plurality of functional alias ID is not activated by the user;

2) an activating state wherein the at least one of the plurality of functional alias ID is not yet activated for the user;

3) the activated state wherein the at least one of the plurality of functional alias ID is activated for the user; and 4) the deactivating state wherein the at least one of the plurality of functional alias ID is activated but not used by the user.

The disclosure provides a method for sharing of a plurality of functional alias ID of MCVideo transmission participant in a Transmission Request message. The method includes transmitting, by at least one Transmission participant sender user equipment (UE), a Transmission Request message to a Transmission Control Server, wherein at least one of the plurality of functional alias ID is encoded and included in the Transmission Request message.

Figure 7:
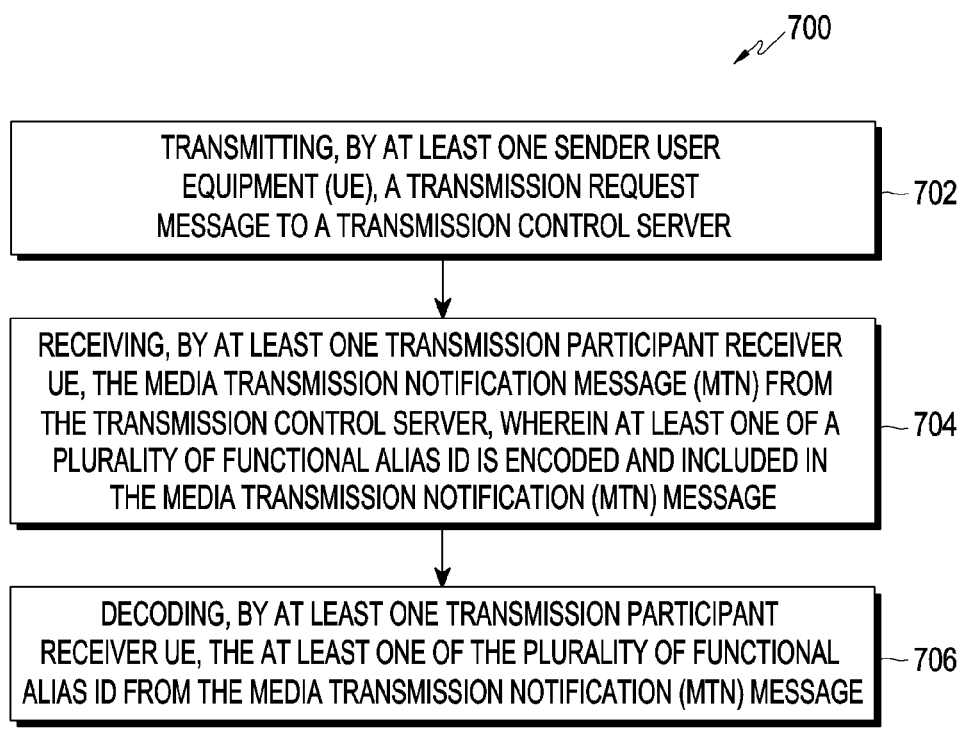
FIG. 7 illustrates a method for obtaining of a plurality of functional alias ID at MCVideo Transmission participant receivers in Media Transmission Notification (MTN) message, according to an embodiment of the disclosure.

FIG. 7 illustrates a method for obtaining of a plurality of functional alias ID at MCVideo Transmission participant receivers in Media Transmission Notification (MTN) message, according to an embodiment of the disclosure.

Referring to FIG. 7, the disclosure includes a method 700 for obtaining of a plurality of functional alias ID at MCVideo Transmission participant receivers in Media Transmission Notification (MTN) message. At operation 702, at least one sender user equipment (UE) transmits a transmission request message to a Transmission Control Server. At operation 704, at least one Transmission participant receiver UE receives a Media Transmission Notification message (MTN) from the Transmission Control Server, wherein at least one of a plurality of functional alias ID is encoded and included in the Media Transmission Notification (MTN) message. At operation 706, the at least one Transmission participant receiver UE decodes the at least one of the plurality of functional alias ID from the Media Transmission Notification (MTN) message.

The method 700 may include transmitting the transmission request message comprises including the functional Alias ID to MCVideo Transmission Control Messages as an information element identifier (IEI) Functional Alias field.

The IEI Functional Alias field may be incorporated in at least one of:
  a) MCVideo Transmission Request Messages;
  b) MCVideo Media Transmission Notification Messages;
  c) MCVideo Receive Media Request Messages; and
  d) MCVideo Media Reception Notification Messages.

The disclosure provides a method for sharing a plurality of functional alias ID of MCVideo participant in a Receive Media Request message. The method includes transmitting, by at least one Transmission participant receiver user equipment (UE), a Receive Media Request Message to a Transmission Control Server, wherein at least one of the plurality of functional alias ID is encoded and included in the Receive Media Request Message.

Figure 8:
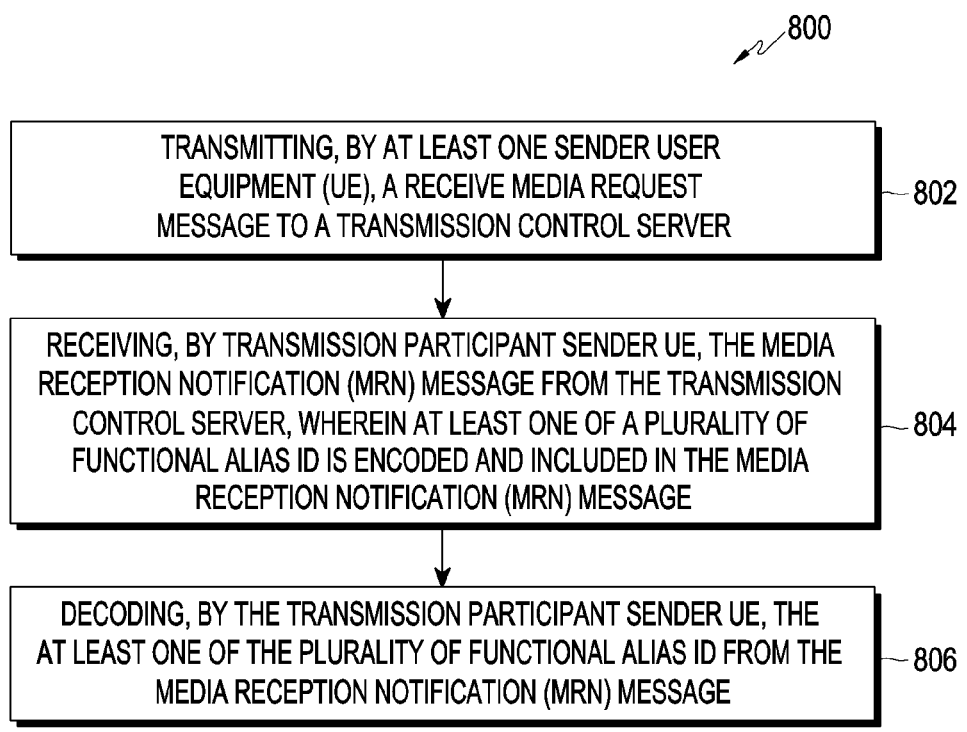
FIG. 8 illustrates a method for obtaining of a plurality of functional alias ID at MCVideo Transmission participant sender in Media Reception Notification (MRN) message, according to an embodiment of the disclosure.

FIG. 8 illustrates a method for obtaining of a plurality of functional alias ID at MCVideo Transmission participant sender in Media Reception Notification (MRN) message, according to an embodiment of the disclosure.

Referring to FIG. 8, the disclosure provides a method 800 for obtaining of a plurality of functional alias ID at MCVideo Transmission participant sender in Media Reception Notification (MRN) message. At operation 802, at least one sender user equipment (UE) transmits a receive media request message to a Transmission Control Server. At operation 804, the Transmission participant sender UE receives the Media Reception Notification (MRN) message from the Transmission Control Server. At least one of a plurality of functional alias ID is encoded and included in the Media Reception Notification (MRN) message. At operation 806, the Transmission participant sender UE decodes the at least one of the plurality of functional alias ID from the Media Reception Notification (MRN) message.

The MCVideo server may be the same as or different from the Transmission Control Server.

In an embodiment, the disclosure includes <functional-alias-URI> to MCVideo Info XML schema (refer 3GPP 24.281 section F.1) that enables the MCVideo User to share their preferred Functional Alias and coded as below:
  1) If the <mcvideoinfo> contains the <mcvideo-Params> element, then <functional-alias-URI> can be included with encrypted content if required.
  2) The <functional-alias-URI> element then includes <mcvideoURI> element whose value represents the role or Functional Alias.

Table 1 discloses an MCVideo Transmission Control specific data fields defined by 3GPP 24.581 with an addition of "Functional Alias field ID" used in the systems and methods of the disclosure.

TABLE 1

Transmission control specific data fields

| Field name | Field ID Decimal | Field ID Binary | Reference |
|---|---|---|---|
| Functional Alias Field | 021 | 00010101 | Subclause detailed in Functional Alias field below |

The proposed Functional Alias field may contain a URI identifying the role that an MCVideo user desires as that instance. Table 2 discloses a Functional Alias field ID methodology used in the systems and methods of the disclosure.

TABLE 2

Table 2: Functional Alias field

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Functional    | Functional    |      Functional Alias         |
| Alias field   | Alias length  |                               :
| ID            |               |                               :
+-+-+-+-+-+-+-+-+-+-+-+-+-+-+-+-+                               :
:                                                               :
+-+-+-+-+-+-+-+-+-+-+-+-+-+-+-+-+-+-+-+-+-+-+-+-+-+-+-+-+-+-+-+-+
```

The <Functional Alias field ID> value is a binary value and is set according to table 9.2.3.1-1. The <Functional Alias length> value is a binary value and includes the value indicating the length in octets of the <Functional Alias field ID> value item, except padding.

The <Functional Alias> value is coded as described in table 8.2.3.19-2 3GPP 24.581.

If the length of the <Functional Alias> value is not (2+ multiple of 4) bytes <Functional Alias field> value shall be padded to (2+ multiple of 4) bytes. The value of the padding bytes is set to zero. The padding bytes are ignored by the receiver.

Table 3 discloses an extension to transmission request message used in the systems and methods of the disclosure.

TABLE 3

Table 3 Transmission request message

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| Subtype |   PT=APP=204  |             length            |
+-+-+-+-+-+-+-+-+-+-+-+-+-+-+-+-+-+-+-+-+-+-+-+-+-+-+-+-+-+-+-+-+
|  SSRC of participant sending the Transmission Request message |
+-+-+-+-+-+-+-+-+-+-+-+-+-+-+-+-+-+-+-+-+-+-+-+-+-+-+-+-+-+-+-+-+
|                          name=MCV0                            |
+-+-+-+-+-+-+-+-+-+-+-+-+-+-+-+-+-+-+-+-+-+-+-+-+-+-+-+-+-+-+-+-+
|                    Transmission Priority field                |
+-+-+-+-+-+-+-+-+-+-+-+-+-+-+-+-+-+-+-+-+-+-+-+-+-+-+-+-+-+-+-+-+
:                          User ID field                        :
+-+-+-+-+-+-+-+-+-+-+-+-+-+-+-+-+-+-+-+-+-+-+-+-+-+-+-+-+-+-+-+-+
|                    Transmission Indicator field               |
+-+-+-+-+-+-+-+-+-+-+-+-+-+-+-+-+-+-+-+-+-+-+-+-+-+-+-+-+-+-+-+-+
|                      Functional Alias field                   |
+-+-+-+-+-+-+-+-+-+-+-+-+-+-+-+-+-+-+-+-+-+-+-+-+-+-+-+-+-+-+-+-+
```

With the exception of the three first 32-bit words the order of the fields are irrelevant.

Subtype:
The subtype is coded according to table 9.2.2.1-1.
Length:
The length is coded as specified in to subclause 9.1.2.
SSRC:
The SSRC field carries the SSRC of the transmission participant sending the Transmission Request message.
The content of the SSRC field is coded as specified in IETF RFC 3550 [3].
Transmission Priority:
The Transmission Priority field is coded as described in subclause 9.2.3.2.
User ID:
The User ID field is used in off-network only and is coded as described in subclause 9.2.3.8.
Transmission Indicator:
The Transmission Indicator field is coded as described in subclause 9.2.3.11.
Functional Alias: The Functional Alias field carries the functional alias URI of the transmitting user. The Functional Alias field is coded as described in subclause 9.2.3.21.

Table 4 discloses an extension to media transmission notification (MTN) message used in the systems and methods of the disclosure.

TABLE 4

Table 4: Media transmission notification message

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| Subtype  |  PT=APP=204   |            length             |
+-+-+-+-+-+-+-+-+-+-+-+-+-+-+-+-+-+-+-+-+-+-+-+-+-+-+-+-+-+-+-+-+
|             SSRC of transmission control server                |
+-+-+-+-+-+-+-+-+-+-+-+-+-+-+-+-+-+-+-+-+-+-+-+-+-+-+-+-+-+-+-+-+
|                         name=MCV1                              |
+-+-+-+-+-+-+-+-+-+-+-+-+-+-+-+-+-+-+-+-+-+-+-+-+-+-+-+-+-+-+-+-+
|                        User ID field                           |
+-+-+-+-+-+-+-+-+-+-+-+-+-+-+-+-+-+-+-+-+-+-+-+-+-+-+-+-+-+-+-+-+
|                     SSRC of transmitter                        |
+-+-+-+-+-+-+-+-+-+-+-+-+-+-+-+-+-+-+-+-+-+-+-+-+-+-+-+-+-+-+-+-+
|           Permission to Request the Transmission field         |
+-+-+-+-+-+-+-+-+-+-+-+-+-+-+-+-+-+-+-+-+-+-+-+-+-+-+-+-+-+-+-+-+
|                  Transmission Indicator field                  |
+-+-+-+-+-+-+-+-+-+-+-+-+-+-+-+-+-+-+-+-+-+-+-+-+-+-+-+-+-+-+-+-+
|                       Track Info field                         |
+-+-+-+-+-+-+-+-+-+-+-+-+-+-+-+-+-+-+-+-+-+-+-+-+-+-+-+-+-+-+-+-+
|                     Functional Alias field                     |
+-+-+-+-+-+-+-+-+-+-+-+-+-+-+-+-+-+-+-+-+-+-+-+-+-+-+-+-+-+-+-+-+
```

With the exception of the three first 32-bit words the order of the fields are irrelevant.
Subtype:
The subtype is coded according to table 9.2.2.1-2.
Length:
The length is coded as specified in to subclause 9.1.2.
SSRC:
The SSRC field carries the SSRC of the transmission control server.
The SSRC field is coded as specified in IETF RFC 3550 [3], which is hereby incorporated by reference.
User ID:
The User ID field carries the MCVideo ID of the user transmitting the media.
The User ID value is coded as specified in subclause 9.2.3.8.
SSRC of Transmitter:
The SSRC of transmitter field carries the SSRC of the user transmitting the media.
The SSRC of transmitter field is coded as described in subclause 9.2.3.16.
Permission to Request the Transmission:
The Permission to Request the Transmission field is coded as specified in subclause 9.2.3.7.
Transmission Indicator:
The Transmission Indicator field is coded as described in subclause 9.2.3.11.
Track Info:
The Track Info field is included when an MCVideo call involves a non-controlling MCVideo function. The methodology of the Track Info field is described in subclause 9.2.3.13.
Functional Alias: The Functional Alias field carries the functional alias URI of the transmitting user. The Functional Alias field is coded as described in subclause 9.2.3.21.

Table 5 discloses an extension to receive media request message used in the systems and methods of the disclosure.

TABLE 5

Table 5: Receive media request message

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| Subtype  |  PT=APP=204   |            length             |
+-+-+-+-+-+-+-+-+-+-+-+-+-+-+-+-+-+-+-+-+-+-+-+-+-+-+-+-+-+-+-+-+
|       SSRC of participant sending the Receieve Request message |
+-+-+-+-+-+-+-+-+-+-+-+-+-+-+-+-+-+-+-+-+-+-+-+-+-+-+-+-+-+-+-+-+
|                         name=MCV0                              |
+-+-+-+-+-+-+-+-+-+-+-+-+-+-+-+-+-+-+-+-+-+-+-+-+-+-+-+-+-+-+-+-+
|                        User ID field                           |
+-+-+-+-+-+-+-+-+-+-+-+-+-+-+-+-+-+-+-+-+-+-+-+-+-+-+-+-+-+-+-+-+
|                     SSRC of transmitter                        |
+-+-+-+-+-+-+-+-+-+-+-+-+-+-+-+-+-+-+-+-+-+-+-+-+-+-+-+-+-+-+-+-+
|                  Transmission Indicator field                  |
+-+-+-+-+-+-+-+-+-+-+-+-+-+-+-+-+-+-+-+-+-+-+-+-+-+-+-+-+-+-+-+-+
|                    Reception Priority field                    |
+-+-+-+-+-+-+-+-+-+-+-+-+-+-+-+-+-+-+-+-+-+-+-+-+-+-+-+-+-+-+-+-+
|                       Track Info field                         |
+-+-+-+-+-+-+-+-+-+-+-+-+-+-+-+-+-+-+-+-+-+-+-+-+-+-+-+-+-+-+-+-+
|                     Functional Alias field                     |
+-+-+-+-+-+-+-+-+-+-+-+-+-+-+-+-+-+-+-+-+-+-+-+-+-+-+-+-+-+-+-+-+
```

With the exception of the three first 32-bit words the order of the fields are irrelevant.
Subtype:
The subtype is coded according to table 9.2.2.1-1.
Length:
The length is coded as specified in to subclause 9.1.2.
SSRC:
The SSRC field carries the SSRC of the transmission participant requesting the reception of the media from another user.
The content of the SSRC field is coded as specified in IETF RFC 3550 [3], which is hereby incorporated by reference.
User ID:
The User ID field is used to carry the identity of the user who is requesting the reception of the media and is coded as described in subclause 9.2.3.8.
SSRC of Transmitter:
The SSRC of transmitter field carries the SSRC of the user transmitting the media.
The SSRC of transmitted field is coded as described in subclause 9.2.3.16.

Transmission Indicator:

The Transmission Indicator field is coded as described in subclause 9.2.3.11.

Reception Priority:

The Reception Priority field is coded as described in subclause 9.2.3.19.

Track Info:

The Track Info field is included when an MCVideo call involves a non-controlling MCVideo function. The methodology of the Track Info field is described in subclause 9.2.3.13.

Functional Alias: The Functional Alias field carries the functional alias URI of the user requesting media reception. The Functional Alias field is coded as described in subclause 9.2.3.21.

Table 6 discloses an extension to media reception notification (MRN) message used in the systems and methods of the disclosure.

TABLE 6

Table 6: Media reception notification message

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| Subtype  |   PT=APP=204  |             length            |
+-+-+-+-+-+-+-+-+-+-+-+-+-+-+-+-+-+-+-+-+-+-+-+-+-+-+-+-+-+-+-+-+
|                SSRC of transmission control server             |
+-+-+-+-+-+-+-+-+-+-+-+-+-+-+-+-+-+-+-+-+-+-+-+-+-+-+-+-+-+-+-+-+
|                           name=MCV1                            |
+-+-+-+-+-+-+-+-+-+-+-+-+-+-+-+-+-+-+-+-+-+-+-+-+-+-+-+-+-+-+-+-+
|                         User ID field                          |
+-+-+-+-+-+-+-+-+-+-+-+-+-+-+-+-+-+-+-+-+-+-+-+-+-+-+-+-+-+-+-+-+
|                      Functional Alias field                    |
+-+-+-+-+-+-+-+-+-+-+-+-+-+-+-+-+-+-+-+-+-+-+-+-+-+-+-+-+-+-+-+-+
```

With the exception of the three first 32-bit words the order of the fields are irrelevant.

Subtype:

The subtype is coded according to table 9.2.2.1-2.

Length:

The length is coded as specified in to subclause 9.1.2.

SSRC:

The SSRC field carries the SSRC of the transmission control server.

The content of the SSRC field is coded as specified in IETF RFC 3550 [3].

User ID:

The User ID field is used to carry the identity of the user who is receiving the media and is coded as described in subclause 9.2.3.8.

Functional Alias: The Functional Alias field carries the functional alias URI of the user requesting media reception. The Functional Alias field is coded as described in subclause 9.2.3.21.

In an embodiment, the method steps to enter the 'G: Transmit Taken' state are mentioned below:

In the method, sending Media Transmission notify message to the reception control
  arbitration logic. The Media Transmission notification (MTN) message:
  1) include the granted MCVideo user's MCVideo ID in the User ID field, if privacy is not requested;
  2) include the granted MCVideo user's SSRC in the SSRC of transmitter field;
  3) include a Message Sequence Number field with a Message Sequence Number value increased with 1;
  4) if the session is a broadcast group call, shall include the Permission to Request the Transmission field set to '0';
  5) if the session is not a broadcast group call, may include the Permission to Request the Transmission field set to '1';
  6) if a group call is a broadcast group call, a system call, an emergency call, an imminent peril call, or a temporary group session, shall include the Transmission Indicator field with appropriate indications; and
  7) if the Transmission request has a Functional Alias field, shall include the Functional Alias of the user in the Functional Alias field of the Transmission Notify message.
  8) initiate the 'general reception control operation' state machine.

At least by virtue of aforesaid embodiment, the disclosure at least leads to the following advantages:
  1) Enabling user to choose a Functional Alias before joining a call;
  2) Enabling user's functional alias to be visible to the participants of the call;
  3) Enabling system to pre-define functional aliases for a type of participants.

In an embodiment, a system for sharing of a plurality of functional alias ID of MCVideo transmission participant in a Transmission Request message is provided The system comprises a processor; and a memory device containing instructions, which when executed by the processor, cause the processor to: transmit, by at least one Transmission participant sender user equipment (UE), a Transmission Request message to a Transmission Control Server, wherein at least one of the plurality of functional alias ID is encoded and included in the Transmission Request message is disclosed.

In an embodiment, a system for obtaining of a plurality of functional alias ID at MCVideo Transmission participant receivers in Media Transmission Notification (MTN) message is provided. The system includes a processor; and a memory device containing instructions, which when executed by the processor, cause the processor to: receive, by at least one Transmission participant receiver UE, the Media Transmission Notification (MTN) message from a Transmission Control Server, wherein at least one of plurality of functional alias ID is encoded and included in the Media Transmission Notification (MTN) message; and decode, by the at least one Transmission participant receiver UE, the at least one of the plurality of functional alias ID from the Media Transmission Notification (MTN) message.

In an embodiment, a system for sharing of a plurality of functional alias ID of MCVideo participant in a Receive Media Request message is provided. The system comprises a processor; and a memory device containing instructions, which when executed by the processor, cause the processor to: transmit, by at least one Transmission participant receiver user equipment (UE), a Receive Media Request Message to a Transmission Control Server, wherein at least one of the plurality of functional alias ID is encoded and included in the Receive Media Request Message.

In an embodiment, a system for obtaining of a plurality of functional alias ID at MCVideo Transmission participant sender in Media Reception Notification (MRN) message is provided. The system includes a processor; and a memory device containing instructions, which when executed by the processor, cause the processor to: receive, by Transmission participant sender UE, the Media Reception Notification (MRN) message from a Transmission Control Server, wherein at least one of a plurality of functional alias ID is encoded and included in the Media Reception Notification (MRN) message; and decode, by the Transmission participant sender UE, the at least one of the plurality of functional alias ID from the Media Reception Notification (MRN) message.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a server in a communication system supporting a public safety service, the method comprising:
   receiving, from at least one sender user equipment (UE), a transmission request message to start a video communication group call, wherein the transmission request message includes functional alias information related to a role of a user of the at least one sender UE; and
   based on the transmission request message, transmitting, to at least one receiver UE in the video communication group call, a media transmission notification message including the functional alias information related to the role of the user of the at least one sender UE.

2. The method of claim 1, wherein the functional alias information related to the role of the user comprises a functional alias uniform resource identifier (URI).

3. The method of claim 1, wherein the video communication group call comprises a mission critical (MC) video communication group call.

4. The method of claim 1, wherein the functional alias information comprises a functional-alias-uniform resource identifier (URI) based element to MCVideo info extensible markup language (XML) schema to enable sharing of the functional alias information.

5. The method of claim 1, wherein at least one of the transmission request message or the media transmission notification message comprises a functional alias identification (ID) as an information element identifier (IEI) functional alias field.

6. A server in a communication system supporting a public safety service, the server comprising:
   a transceiver; and
   at least one processor coupled with the transceiver and being configured to:
      receive, via the transceiver from at least one sender user equipment (UE), a transmission request message to start a video communication group call, wherein the transmission request message includes functional alias information related to a role of a user of the at least one sender UE, and
      based on the transmission request message, transmit, via the transceiver to at least on receiver UE in the video communication group call, a media transmission notification message including the functional alias information related to the role of the user of the at least one sender UE.

7. The server of claim 6, wherein the functional alias information related to the role of the user comprises a functional alias uniform resource identifier (URI).

8. The server of claim 6, wherein the video communication group call comprises a mission critical (MC) video communication group call.

9. The server of claim 6, wherein the functional alias information comprises a functional-alias-uniform resource identifier (URI) based element to MCVideo info extensible markup language (XML) schema to enable sharing of the functional alias information.

10. The server of claim 6, wherein at least one of the transmission request message or the media transmission notification message comprises a functional Alias identification (ID) as an information element identifier (IEI) functional alias field.

* * * * *